(12) United States Patent
Faith (10) Patent No.: US 8,284,048 B2
(45) Date of Patent: Oct. 9, 2012

(54) AUTO ACTIVATION OF A MOBILE DEVICE

(75) Inventor: Patrick Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/069,140

(22) Filed: Mar. 22, 2011

(65) Prior Publication Data

US 2011/0291814 A1 Dec. 1, 2011

Related U.S. Application Data

(60) Provisional application No. 61/316,358, filed on Mar. 22, 2010.

(51) Int. Cl.
- *G08B 1/08* (2006.01)
- *H04W 4/00* (2009.01)
- *H04W 24/00* (2009.01)
- *H04M 3/00* (2006.01)

(52) U.S. Cl. ......... 340/539.22; 340/539.11; 340/539.13; 455/435.1; 455/456.1; 455/418; 455/419

(58) Field of Classification Search ................. 340/10.5, 340/539.22, 593, 643, 539.11, 539.13; 755/435.1, 755/456.1, 437, 439, 418, 419
See application file for complete search history.

(56) References Cited

U.S. PATENT DOCUMENTS

| | | | |
|---|---|---|---|
| 5,477,038 A | 12/1995 | Levine | |
| 5,936,523 A | 8/1999 | West | |
| 6,285,991 B1 | 9/2001 | Powar | |
| 8,040,233 B2 | 10/2011 | Adappa | |
| 2003/0050874 A1 | 3/2003 | Sesek et al. | |
| 2004/0011866 A1 | 1/2004 | Saad | |
| 2009/0132681 A1 | 5/2009 | Schneider | |
| 2009/0307118 A1 | 12/2009 | Baumgartner | |
| 2009/0312000 A1 | 12/2009 | Wakefield | |
| 2010/0211504 A1 | 8/2010 | Aabye | |
| 2011/0251950 A1 | 10/2011 | Ciurea | |

OTHER PUBLICATIONS

International Search Report of the International Searching Authority for Application No. PCT/US2011/029436, mailed on Oct. 25, 2011, 5 pages.

Written Opinion of the International Searching Authority for Application No. PCT/US2011/029436, mailed on Oct. 25, 2011, 4 pages.

*Primary Examiner* — Brian Zimmerman
*Assistant Examiner* — Omeed Alizada
(74) *Attorney, Agent, or Firm* — Kilpatrick Townsend & Stockton LLP (57) ABSTRACT

Embodiments of the invention are directed to apparatuses, systems, and methods for automatically activating a consumer device using a sensor capable of detecting an external stimulus and location determination system capable of providing current location data for the consumer device when a user receives a device. The location determination system provides location data, which is sent to the activation server, in response to the sensor actuating. The location data determined at the time the sensor senses the external stimuli is compared to location data stored on the activation server to automatically activate the consumer device.

17 Claims, 6 Drawing Sheets

*Fig. 7*

AUTO ACTIVATION OF A MOBILE DEVICE

The present application is a non-provisional application of and claims priority to U.S. Provisional Application No. 61/316,358, filed on Mar. 22, 2010, the entire contents of which are herein incorporated by reference for all purposes.

BACKGROUND

When receiving a mobile or other consumer device, such as a credit card, debit card, mobile phone, computer, etc., a user of the consumer device is typically required to call the service provider (e.g., issuer of the device), confirm receipt of the device and, subsequently, activate the consumer device for use. The user is usually given options for activating the consumer device, such as calling the issuer or registering the consumer device online. This activation requires a significant amount of user interaction with the issuer of the consumer device. The user is usually required to wait to speak to a live representative, navigate a voice-automated menu or create an online account.

For example, a user may be required to call a specific telephone number (e.g. an "800" number) to activate or register the consumer device. In the case of a mobile telephone, the user may send a text or SMS message to a specified number to register or activate the device. In another example, the user may be required to call the specific telephone number from the user's home phone number or a phone number associated with the new device of a user's account. Alternatively, the user may be required to log into a website to activate or register the device. In each exemplary situation, the user may also be asked personal information and/or information related to the consumer device, such as the card verification value (CVV) and card number on a credit card, or the serial number on a cellular telephone.

Though there are many methods that could be used by the user to provide information to the issuer of the consumer device for activation or registration of the consumer device, each of these methods provides an inconvenience to the customer, i.e., if the customer does not have a computer and/or Internet connection to register online, or an additional telephone line from which to call and activate a cellular telephone. Furthermore, the process of activation is time-consuming.

Embodiments disclosed herein address these and other problems, individually and collectively.

BRIEF SUMMARY

Embodiments described herein address automatically activating a mobile phone or other consumer device, such as payment card or token, so that user interaction is minimized. A sensor in the consumer device can detect one or more external stimuli. When the sensor detects the appropriate external stimulus, it can initiate a location determination module in the consumer device to determine the location of the consumer device. The location of the consumer device when the sensor is actuated is then communicated to an issuer or activation entity to verify that the determined location of the consumer device is corresponds, at least approximately, to a location associated with the recipient of the device. The consumer device can then be utilized to conduct transactions. The location of the consumer device is determined through a location determination system, which can include a module on the consumer device for providing location based information to the issuer and/or payment processing network.

In some embodiments, a consumer device capable of automatic activation can include a processor, a sensor for detecting an external stimulus, a location determination system for determining location data of the consumer device, an antenna for communicating the location data to a communication network, and a memory coupled to the processor. The memory can include a non-transitory computer readable medium including code, executable by a processor, for implementing a method for automatically activating the consumer device with little or no user interaction. The method in such embodiments can include sending a request for the location data to the location determination system in response to the prescribed or predetermined external stimulus being detected by the sensor. The method can also include generating an activation request signal including the location data received from the location determination system and the sending the activation request signal to the antenna.

Other embodiments can include a method for automatic activation of a consumer device that can include packaging a consumer device associated with an account of a user. The account information can be stored on the consumer device. The method can also include detecting an external stimulus with a sensor in the consumer device and then determining current location data of the consumer device with a location determination system, sending an activation request signal to a communication network through an antenna.

Yet other embodiments can include methods for automatic activation of a consumer device on a server computer that can include assigning a user a consumer device with an associated account. Storing predetermined location data associated with the user on the server computer; receiving an activation request message from the consumer device, including the current location data of the consumer device, comparing the predetermined location data and the current location data, and sending an activation response signal to the consumer device.

These and other embodiments of the invention are described in further detail below.

DETAILED DESCRIPTION

Embodiments of the invention relate to the idea of automatically activating a consumer device, such as a mobile phone or a credit card, when the consumer device is issued to and received by a user.

A consumer device can include a location determination system and a sensor. The consumer device can utilize the location determination system and sensor for initial enablement (e.g., activation) of the device.

According to an embodiment, the consumer device is packaged by a device manufacturer, reseller, or issuer and sent to the user. When the user opens the package containing the consumer device and removes the device from the packaging, light (or other external stimuli) causes the consumer device to activate. Upon activation, the current location of the consumer device is determined using the location determination system. The location and other consumer device information (e.g., serial number, card number, etc.) can then be transmitted to a verification or activation entity, such as an issuer or manufacturer, for verification or activation.

The consumer device can further utilize the location determination system for verification with an issuer and/or payment processing network during a transaction at merchant location. The location determination system can include as GPS (Global Positioning System) or other geographic location determination system. The consumer device can be used as a portable payment device such as one utilized for the payment for goods or services from a merchant. For example, the consumer device can be capable of performing transactions in a manner similar to a traditional credit card or debit card.

Using the location and other consumer device information, the device manufacturer or issuer can verify the receipt of the consumer device (e.g., through delivery tracking number), functionality of the consumer device (e.g., transmitting a signal, message or file), and proper use (e.g., activation at correct address). Automatic verification of this information can be used to better prevent fraudulent use of consumer devices.

There are many advantages to the embodiments of the invention. One advantage for the user is that the user is not required to manually activate the device by calling or otherwise contacting the issuer of the consumer device. Similarly, the device manufacturer or issuer receives immediate confirmation that the device is operational and does not need to implement activation systems (e.g., voice-automated systems). having to wait for the user to go through the activation steps (such as calling an "800" number or logging into a website).

Exemplary systems, apparatuses, and methods for automatic activation of a consumer device and subsequent verification of activation and purchase transaction performed with the consumer device are provided in the following sections.

I. Exemplary Systems

Figure 1:
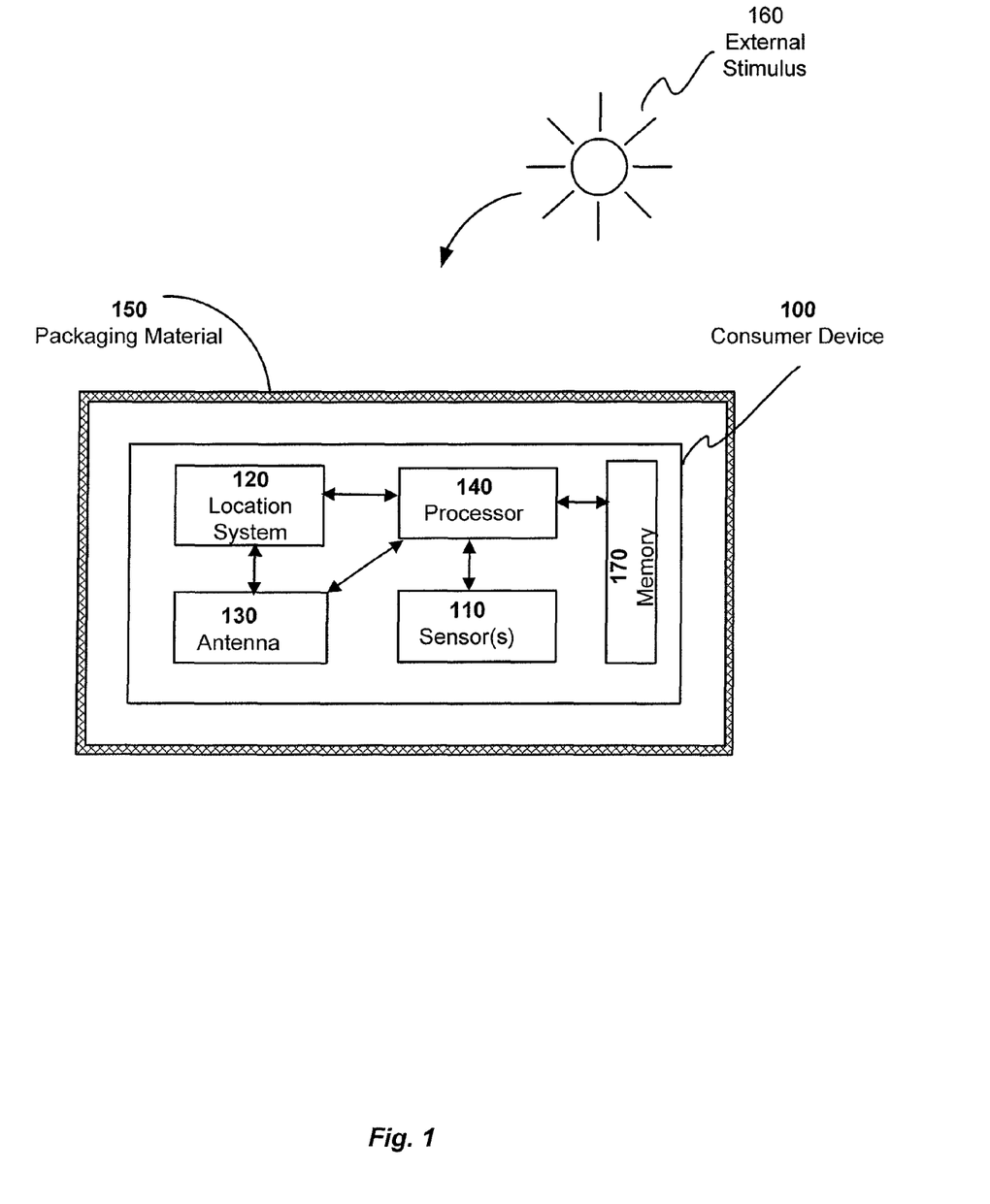
FIG. 1 illustrates a system for automatic activation of a consumer device in an embodiment.
Figure 2:
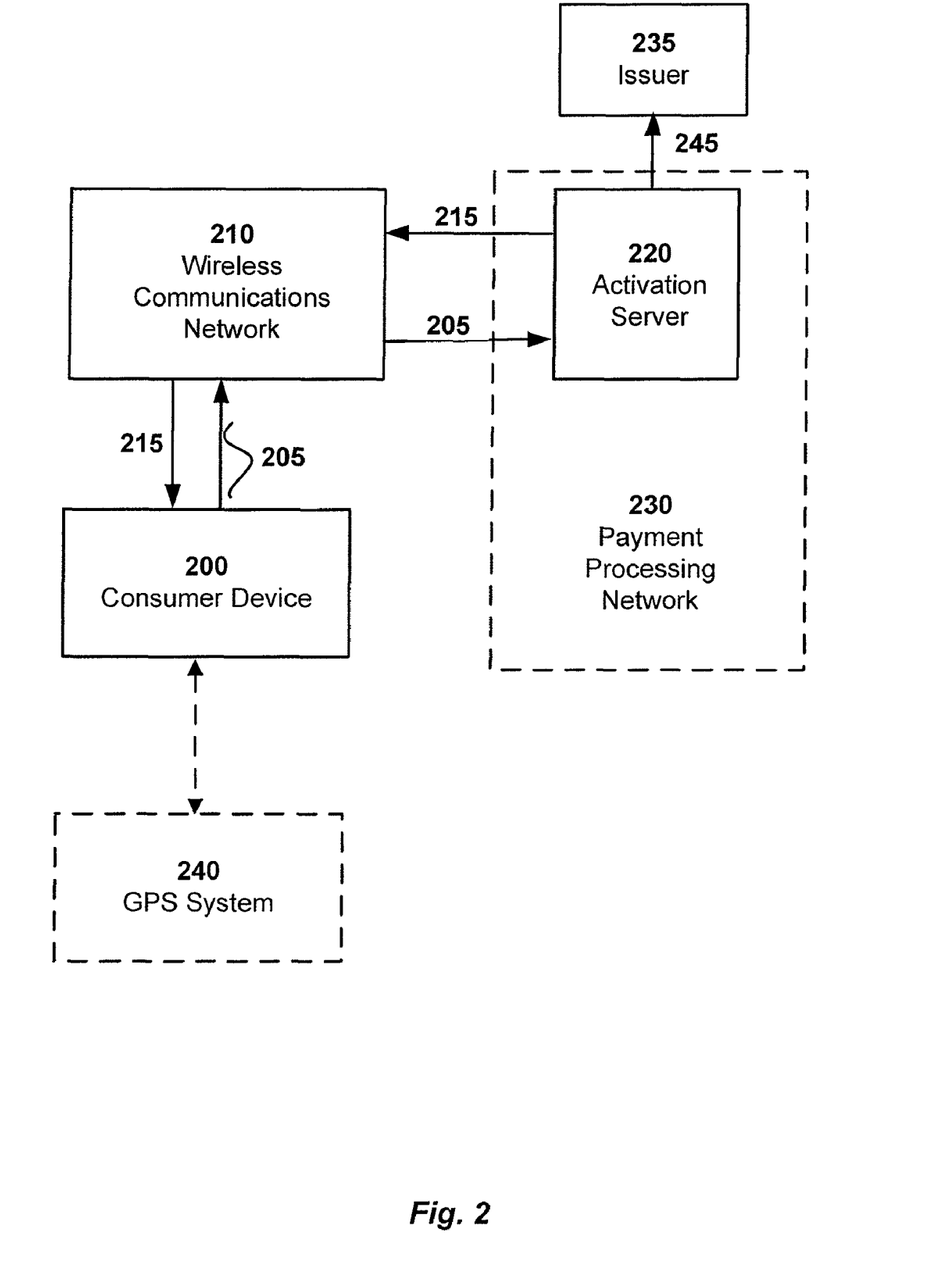
FIG. 2 illustrates a block diagram of a communication flow in the system of FIG. 1 in an embodiment.
Figure 3:
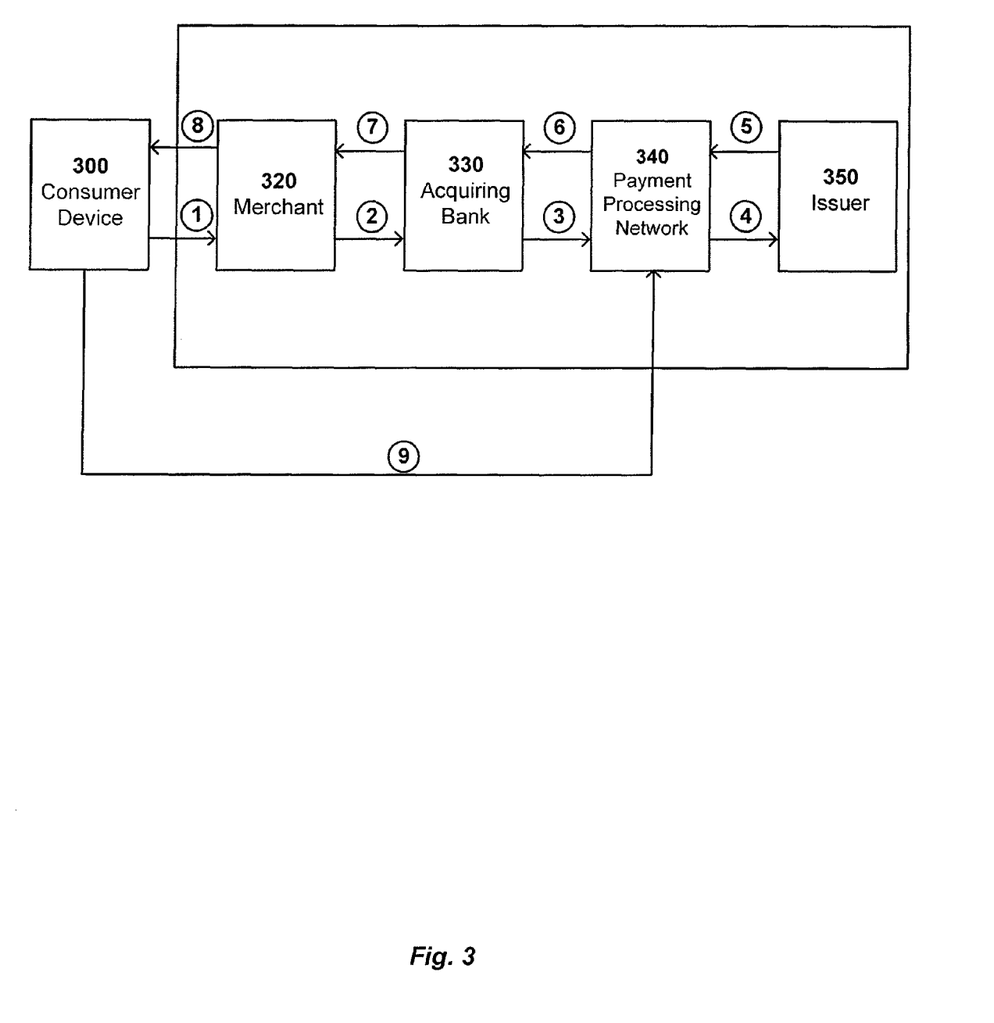
FIG. 3 illustrates a system for performing a purchase transaction with a consumer device in an embodiment.

Systems according to embodiments of the invention are illustrated in FIGS. 1-3.

Referring to FIG. 1, a consumer device 100 in a system providing an external stimulus 160 is shown. The consumer device 100 can include one or more sensors 110, a location determination system 120, an antenna 130, a processor 140 and a memory 170 for storing instructions executable by the processor 140. The consumer device 100 is packaged with packaging material 150. The packaging material 150 can include materials that can prevent external stimuli from prematurely activating the consumer device 100, such as while the consumer device is in transit. For example, the packaging materials may include an opaque film coating, such as a metallic film and/or an insulator. Such packaging materials can include films or stickers that are applied to or cover some or all of the active area of the sensor. For example, in some embodiments, the packaging can be a sticker that a user can remove to expose the sensor to one or more environmental conditions to trigger activation of the consumer device.

The sensor 110, location determination system 120, antenna 130, and processor 140 are communicatively coupled in the consumer device 100. The memory 170 can include a computer readable medium embodied by one or more memory devices, is also be operatively coupled to the processor 140 and can store instructions which are executable by the processor 140 in order to perform the method of FIG. 6.

Consumer device 100 can be in the form of a credit card, a debit card, a smart card, an electronic printed media type device, a mobile or smart phone, a desktop computer, a laptop computer, a tablet computer, a PDA, a cable router, or any other consumer device, portable or not, that can require activation once it is received by the intended recipient at an intended or anticipated location. The aforementioned electronic printed media type device can include any number of passive and active electric devices that can be printed or deposited on a substrate.

An electronic printed media type device can include a near field communication (NFC) element, such as a radio-frequency identification (RFID) tag, that can be used to sense or detect an applied radio frequency signal or as the means for conveying data from the NFC element to a reader device. In such embodiments, the packaging can include a metallic or other blocking material applied as a sticker or other removable coating or film to prevent the NFC element from detecting any errant or unintended signals and, thus, from inadvertently triggering the activation of the consumer device. Such devices are particularly useful for non-activated advertisements or coupons distributed in newspapers, magazines, postcards or other durable and nondurable media.

In embodiments that incorporate an electronic printed media type device can include coupons or other offers that must first be activated before a user can redeem or otherwise use the coupon or offer. To activate the coupon or offer, a sensor or RFID tag can be exposed to an external stimulus, such as a radio frequency signal, or environmental condition at a predefined location. In some embodiments, the predefined location can be a merchant's location, while in other embodiments the predefined location can be a user's home address. Detecting, entering or otherwise using location information about that predefined location, the electronic printed media type device can be activated and the coupon or offer can be redeemed or used. The predefined location can add an additional level of security by controlling the environment in which the stimulus or environmental condition is applied to and/or information is read from the electronic printed media type device.

The sensor 110 can be configured to be used only once, for example at the time the consumer device 100 is initially activated, however, it is also possible to configure the consumer device 100 to use the sensor 110 throughout the life span of the device. For example, the consumer device 100 may be a payment token, such as a credit card, that can be used to initiate payment transactions with a merchant in either a traditional physical store location or using an online store. The sensor can be used to detect environmental conditions at the time the purchase or other transaction is initiated. This information can then be sent along with location and other purchase information for documentation, fraud detection and other purposes. For instance, sensor may located in a region of a credit card that would experience a certain period of darkness as the credit card is swiped through a point-of-sale card reader device. If that observed time period is too long or too short, then the transaction may be flagged for further investigation.

The sensor 110 can be configured or designed to detect external stimuli, such as light, heat, movement, pressure, oxygen and other environmental conditions. For example, FIG. 1 illustrates an embodiment where light 160 is used as the external stimulus. In other examples, heat from a user's hand, pressure on a surface of the housing or depression of a button on the device may be detected by the sensor 110. The user turning on the consumer device 100 using an ON/OFF switch or starting an starting or running an internal application resident on the consumer device can be external stimulus 160. Similarly, the user entering a response when prompted by an application can also be external stimulus 160. In such embodiments, it is traditional to refer to the external stimulus simply as a stimulus. Plugging the consumer device into a power source to charge prior to use or connecting it to a computing device may provide an external stimulus 160. In other embodiments, images, such as photos and video, audio and acceleration can be used as factors in determining the location of the consumer device. For example, a user may be required to take a picture or video of herself or a feature of an area or region specific to the user or the issuer of the consumer device and send that information along with the location information to activate a consumer device, such as a camera phone. In other embodiments, audio of the surrounding area can be captured and analyzed to determine the environmental condition or other stimuli as part of the automatic activation process. The aforementioned examples are only representative of some embodiments and it is understood that any number of external stimuli can be detected with the appropriate sensor 110. Additionally, it is understood that any number of sensors can be utilized alone or together to detect the external stimuli. For instance, light and pressure from a user's hand may both be utilized to actuate on or more sensors on the mobile phone. This may aid, for example, in preventing premature activation of the mobile phone during transit and/or during packaging.

Before a consumer device 100 is sent to a user, the device is packaged with packaging material 150 by the manufacturer or issuer. The packaging material 150 may be designed to prevent the external stimulus 160 from actuating the sensor 110, especially during transit and handling. While packaged, the sensor 110 may be in a sleep state or turned off to prevent premature detection of the external stimulus 160. In an embodiment where the sensor is in a sleep state, the stimuli can similarly cause the sensor to turn on and actuate. In the embodiment where the sensor is turned off, charging the power source (e.g., battery) on the consumer device can turn the sensor on or provide the sensor with a dissipating charge sufficient enough to communicate a signal or message indicating the stimuli has been sensed to the processor. The sensor does not need to stay active for an extended period of time. As used herein, the terms signal and message can be used interchangeably to refer to any electronically transmitted data that can be used to communicate information.

When the user receives the consumer device 100 and removes the packaging 150, the sensor 110 detects an external stimulus 160. As previously mentioned, this detection can be in response to light, heat, movement, pressure, or a combination of any one or more of these and other stimuli. When the sensor 110 detects an external stimulus 160, the sensor 110 can communicate a signal to the processor 140 indicating that the external stimulus 160 has been detected. The processor 140 may be any type of central processing unit that is capable of receiving input, processing data, executing instructions, and generating an output. After receiving the external stimulus sensor signal, the processor 140 can send a request to the location determination system 120 to provide current location information of the consumer device.

The location determination system 120 may use GPS (Global Positioning System), cellular network towers triangulation, IP addresses (via a WiFi or other network interface), or other geographic location determination system information to determine the current location of the consumer device 100. For example a consumer device may not be GPS enabled, which requires the device utilize another means for providing a current location. The location information can be an approximate location, as some location techniques (e.g., triangulation) do not provide the same level of precision as others (e.g., GPS, IP address).

After a location of the consumer device has been detected and the processor request is completed, the location determination system 120 can return a response signal, including the location data, to the processor 140. The processor 140 can then send a location signal, which contains the current location data of the consumer device 100, to the antenna 130.

The antenna 130 may be part of any suitable wireless transmission or reception device. For example, the antenna 130 may use WiFi, cellular networks, or Bluetooth. The antenna 130 sends the location signal, through a network, such as the Internet or a cellular network, to the activation server for approval. In one embodiment, the antenna 130 transmits a location signal through a wireless communication network to a mobile gateway server (not shown) which is in communication with the activation server. In another embodiment, the location signal is transmitted through a WiFi interface over a wireless local area network. In yet another embodiment, the user may bring the consumer device within proximity of a computing device having connectivity to the Internet (or other network communication medium), and transfer the location signal through Bluetooth or other short range wireless communication protocol. In an alternative embodiment, such as where the user of the consumer device does not have a Bluetooth and/or WiFI enabled consumer device, and there is no wireless or WLAN availability, the user can use a hard-wire interface on the consumer device to connect the device with a computing device with network connectivity.

Referring now to FIG. 2, a system used for automatic activation of a consumer device 200 is provided. When an external stimulus is detected and the current location is determined through communication with a GPS system 240, the wireless network, or other location determination means, the location data of the consumer device 200 is wirelessly communicated to an activation server 220. The consumer device can generate a signal including an activation request including the appended location data. In addition to the location data of the consumer device 200, the activation request signal 205 can include other information such as a device ID, serial number, user name associated with the device, account number, etc. The aforementioned activation request signal 205 is sent to a wireless communications network 210, which is communicatively coupled to the activation server 220. In one embodiment, the wireless communication network can append the location data of the consumer device to the activation request signal 205 prior to forwarding the activation request signal 205 to the activation 220. In another embodiment, the activation request signal can be communication through another medium, such as if the consumer device 200 is WiFi enabled.

The activation server 220 can be used to verify the information in the activation request signal 205 and activate a payment account associated with the consumer device 200. As used herein, the term payment account can refer to any personal or group account that can be used for conducting various financial and non-financial transactions. Accordingly, the activation server 220 can be coupled to a database (not shown), which stores the acceptable locations at which the consumer device can request activation along with the associated consumer device and payment account information. The activation server 220 can then communicate an approval of activation, in which case, the information included in the activation request signal is verified, or a denial of activation. The approval or denial can be provided in an activation response signal 215, which is returned through the wireless communications network 210 to the consumer device 200. If approved, the consumer device is activated. In one embodiment, the user may receive a short message service (SMS) (i.e., text), electronic mail and/or other alert that indicates that activation of the consumer device is complete. The alert can be displayed or otherwise provided to the user on consumer device, such as a sound or restart of the of the consumer device 200.

In addition to providing an activation response signal 215 to the consumer device 200, the activation server can provide an activation status response message 245 to an issuer 235 of the consumer device 200. The status message 245 can include activation details, such as the time, location of activation. In an embodiment where the activation is denied the issuer can be made aware of possible fraudulent possession of the consumer device and can notify the user. The activation server 220 can be communicatively coupled to the issuer 235 through the wireless communications network, a WAN or LAN or other communication medium.

In one embodiment, the activation server 220 can be associated with and part of the payment processing network 230, and communicatively coupled to, an issuer 235 that issues credit cards or other similar portable user devices. Alternatively, the activation server 220 may be part of the payment processing network 230. After the information in the activation request signal 205 is verified, the issuer 220 may send an activation successful signal 215, through the communication network 210, to the consumer device 200. An activation successful message may be displayed on the consumer device 200 upon receipt of the activation successful signal 215.

The location-enabled consumer device 200 may then be used to make payments and perform other functions traditionally performed by a credit card or debit card. For example, the user may use the location-enabled consumer device 200 to make a point of sale (POS) purchase using the device in conjunction with a payment processing network 230.

Referring now to FIG. 3, a system is illustrated with a transaction flow for utilizing the consumer device 300 to complete a purchase after automatic activation is completed. After successful activation, the consumer device 300 can be used to conduct a purchase through a cellular or other wireless network or through a near field communication (NFC), dependent on the mobile phone 300 interface capabilities. For example, location-enabled consumer device 300 may be used to make a point of sale (POS) purchase of goods or services at a merchant 320 location (e.g., in a store).

In stage 1, a user of the consumer device 300 interfaces the consumer device 300 with a POS terminal at a merchant location. In such an embodiment, the consumer device can communicate stored payment information via a contact or contactless interface. For example, the user can tap the consumer device 300 on the POS terminal or place the consumer device within proximity to the POS terminal. In a embodiment where the consumer device does not have a NFC or contact chip capabilities, the user can simply communicate the payment information displayed on the consumer device to the merchant, and the merchant can manually enter the payment information into the POS terminal.

In alternative embodiments, the merchant 320 has an online sales portal (e.g. a website) that can be accessed through an Internet connection. Preferably, the merchant's sales portal is accessible via an Internet connection (e.g. WiFi, Edge, 3G, 4G, etc.) on the consumer device 300. In such an embodiment, the consumer device 300 can be used to make purchases in ways similar to a traditional credit card or debit card after successful activation.

The consumer device 300 can be in any suitable form. In some embodiments, the consumer device is portable in nature and may be referred to as a portable device. Suitable consumer devices can be hand-held and compact so that they can fit into a user's pocket (e.g., pocket-sized). They can include smart cards, which can include a wireless communication interface, such as a near field communications interface. Other examples of a consumer device include cellular phones, personal digital assistants (PDAs), pagers, payment devices, security cards, access cards, smart media, transponders, and the like. The consumer device can store information associated with debit devices (e.g., a debit card), credit devices (e.g., a credit card) and/or stored value devices (e.g., a stored value card).

In stage 2, the merchant receives the payment information from the consumer device 300. The information can be in the form of a credit card number and associated information (e.g., expiration date, CVV, etc.) or account number and associated information (e.g., bank information, routing number, etc.) such as seen on a check. The merchant POS terminal establishes a communication link through a communication medium, such as the Internet. The POS terminal can be connected through a wired or wireless interface and can generate an authorization request message, including the transaction details of the purchase. The authorization request message is then forwarded to an acquirer for further processing.

In stage 3, the transaction is conducted in a usual manner, and the authorization request message is received by an acquirer and then sent to a payment processing network associated with the payment information. In an alternative embodiment, a payment processing network 340 can be in direct communication with the merchant and an acquirer is not utilized.

The payment processing network verifies the payment account utilized by the consumer device 300 for the transaction. This verification may be accomplished through card verification value (CVV) or other verification value and consumer device associated information that can be appended to the authorization request message when the payment information is communicated to the merchant 320. The payment processing network can be the credit card association through which the payment account stored on the consumer device was provided.

The payment processing network 340 can include data processing subsystems, networks, and operations used to support and deliver authorization services, exception file services, and clearing and settlement services. For example, the payment processing network 350 may comprise a server computer, coupled to a network interface, and a database of information. An exemplary payment processing network 340 may include VisaNet™. Payment processing networks such as VisaNet™ are able to process credit card transactions, debit card transactions, and other types of commercial transactions. VisaNet™, in particular, includes a VIP system (Visa Integrated Payments), which processes authorization requests and a Base II system that performs clearing and settlement services.

As noted above, the payment processing network 340 can include a server computer. As used herein, a "server computer" is typically a powerful computer or cluster of computers. For example, the server computer can be a large mainframe, a minicomputer cluster, or a group of servers functioning as a unit. In one example, the server computer may be a database server coupled to a Web server. The payment processing network 340 can use any suitable wired or wireless network, including the Internet. Furthermore, the server computer in the payment processing network 350 can include a processor and a computer readable medium coupled to the processor. The computer readable medium can comprise code, which is executable by the processor for implementing methods such as those outlined in the following section.

Referring back to FIG. 3, in stage 4, the payment processing network sends the authorization request message to the issuer 350 of the consumer device 300 for final approval of the transaction. Dependent on the sufficiency of funds in the account and the associated consumer device information, which also can be verified by the issuer 350 of the device if the activation server is not associated with the payment processing network. The transaction is then either approved or denied.

In stage 5, the issuer 350 then generates an authorization response message, including the approval or denial of the transaction. The authorization response message is then returned to the payment processing network 340.

In stage 6, the authorization response message is then communicated to the acquirer. The acquirer can then charge the proper fee for the transaction, based on the approval or denial and the manner in which the transaction was processed by the merchant (e.g., hand-keyed, PayWave) and return the authorization response message to the merchant.

In stage 7, the authorization response message is received by the merchant 320, and the transaction is either confirmed or denied. In an embodiment where the user's consumer device payment information is denied, the merchant can receive indication as to the reasons why the transaction was denied by the issuer. In one embodiment, the issuer can communicate a deactivation signal to the consumer device 300 after a predetermined amount of denials has been received.

In stage 8, in some embodiments, the user can receive a direct communication of the authorization response message from the merchant, such as through WiFi or NFC communication with the merchant 320 POS terminal. In some embodiments, the issuer 350 and/or payment processing network 340 can send an SMS, email or other communication to the consumer device indicating approval or denial of the transaction, along with transaction and/or other account details. In an embodiment, the issuer 350 can send the aforementioned direct communication to the consumer device 300 in stage 5, when the approval or denial response message is returned to the payment processing network.

In an additional embodiment, in stage 9 the user's consumer device 300 can be further verified during a transaction through a communication with the payment processing network 340 and/or issuer 350. For example, if the activation server is an entity within the payment processing network 340, the same wireless communications network 210 in FIG. 2 utilized to activate the consumer device 300 can be utilized to receive current location information of the consumer device 300 at the payment processing network after activation. The location determination system of the consumer device 300 can provide the location data and the payment processing server 340 can compare the data to the known location of the merchant sending the authorization request. The location determination system can be initiated to provide such location data to the payment processing network 340 each time that payment information is communicate to a POS terminal during a transaction at a merchant 320 location.

As used herein, an "issuer" 350 is typically a business entity (e.g., a bank) which maintains financial accounts for the consumer and often issues a portable device such as a credit or debit card to the consumer. A "merchant" 320 is typically an entity that engages in transactions and can sell goods or services. An "acquirer" 330, or acquiring bank, is typically a business entity (e.g., a commercial bank) that has a business relationship with a particular merchant 320 or other entity. Some entities can perform both issuer 350 and acquirer 330 functions. Embodiments of the invention encompass such single entity issuer-acquirers.

Furthermore, embodiments of the invention are not limited to the above-described embodiments of the system in FIG. 3. For example, although separate functional blocks are shown for an issuer 350, payment processing network 340, and acquirer 330, some entities perform all of these functions and are included in embodiments of invention.

II. Exemplary Methods

Figure 4:
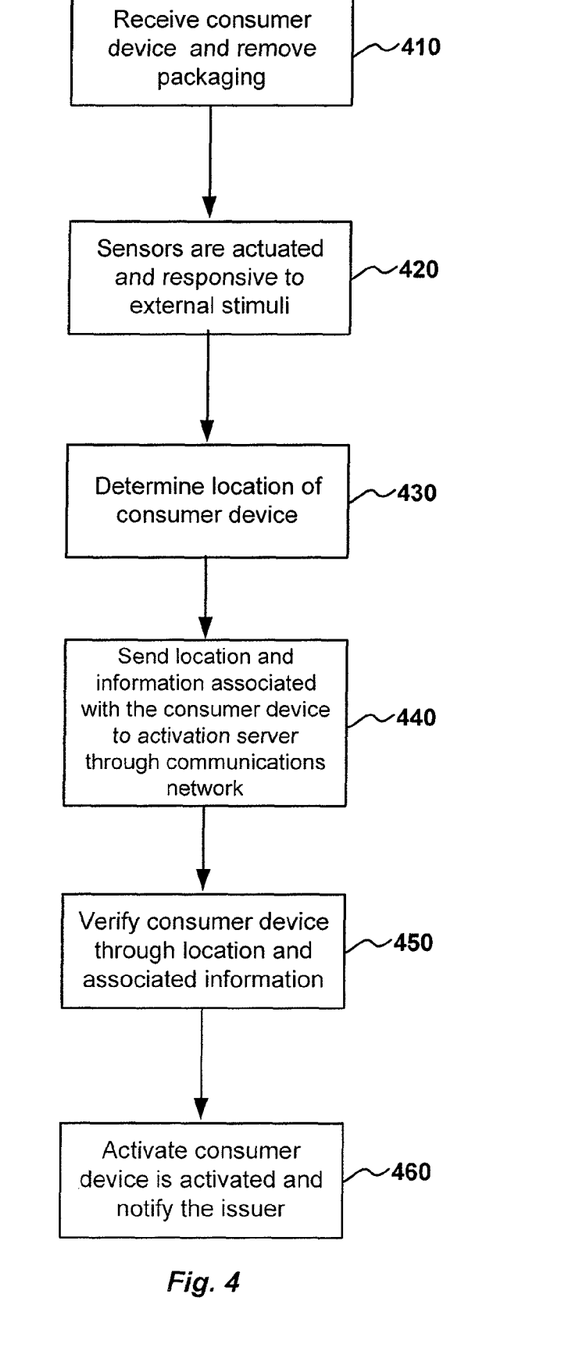
FIG. 4 illustrates a flowchart of a method for automatic activation of a mobile phone in an embodiment.
Figure 5:
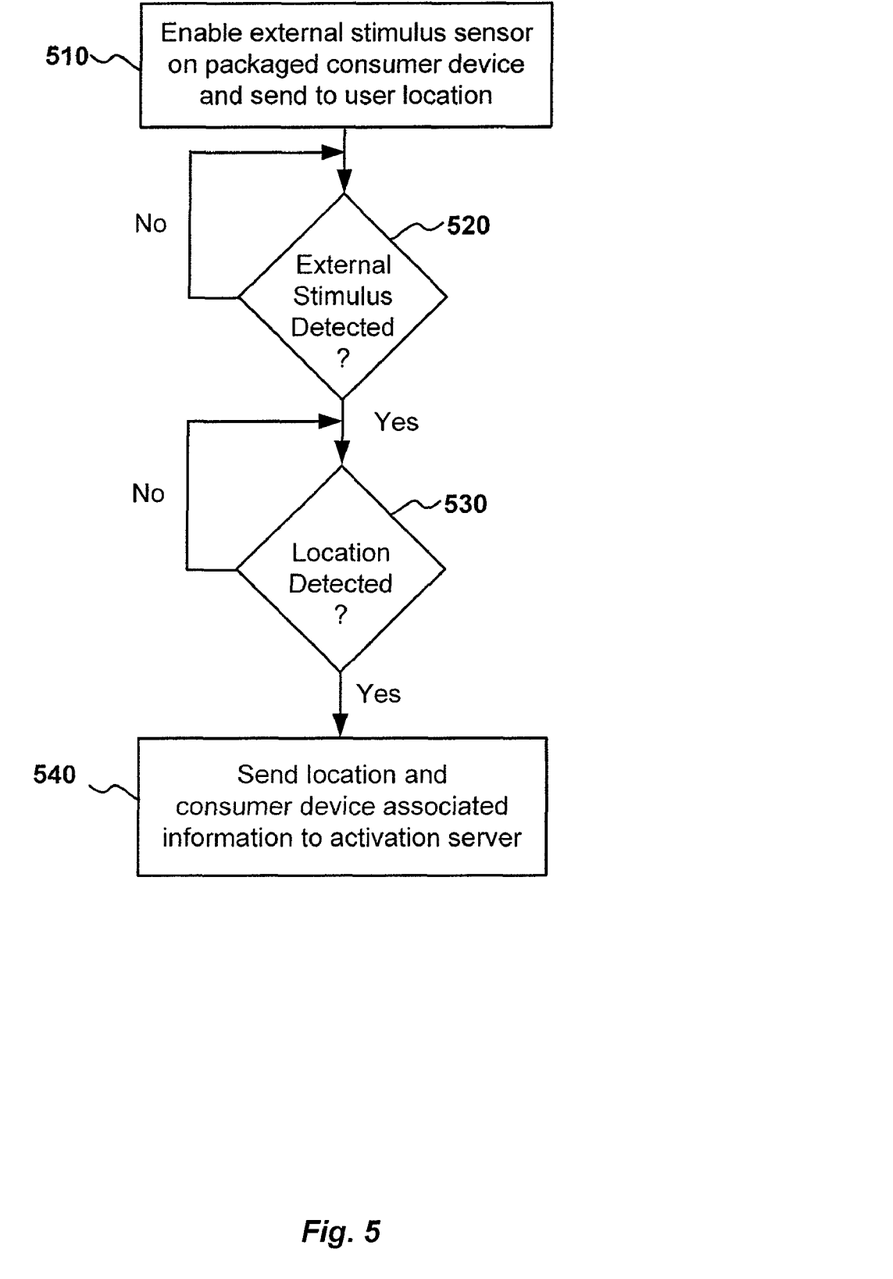
FIG. 5 illustrates a diagram of a method for providing automatic activation of a consumer device in an embodiment.

Methods according to embodiments of the invention are illustrated in FIGS. 4-5. The methods are described with reference to the system elements in FIG. 1.

FIG. 4 illustrates a method 400 of automatically activating a consumer device according to an embodiment of the present invention.

In step 410, the user opens a consumer device 100 and removes the packaging 150 which disables the sensor 110. The packaging 150 can include additional instructions for necessary steps to take in order to actuate the sensor in case the activation is not automatically initiated. For example, the user may be asked to hold the device in front of a light or power the device on, etc.

In step 420, the sensor 110 is actuated by an external stimulus. As previously discussed in FIG. 1, the external stimulus can include any on or number of stimuli utilized to actuate one or more sensors on the consumer device. In one embodiment, the consumer device 100 includes at least two sensors to provide a failsafe in the situation where one sensor fails to automatically actuate. In some embodiments, the consumer device packaging 150 can be small, such as an adhesive (e.g., sticker) which, when removed, allows the sensor to be susceptible to external stimuli, causing the sensor to actuate. For example, a sticker on the device can be covering a light sensor, such as a photodiode. When the sticker is removed, light enters the photodiode and the photodiode actuates by producing a photoelectric current. In some embodiments, the stimuli can allow the sensor to provide a sufficient charge to the consumer device for the location determination and activation request signal to be sent to the communication network without powering the device on.

In step 430, the current location of the consumer device 100 is determined by the location determination system 120. Location information can be determined in a number of ways. For example, the I.P. address of the network to which the consumer device can connect, such as through WiFi or a Bluetooth or hard-wired interface with a computer connected to a network, can be used to determine the general or geographic location in which the consumer device is connected to the network. In other embodiments, the location data can be determined through the closest cellular tower(s) by which the consumer device is located. In yet other embodiments, the consumer device can include a GPS receiver that can use the signals of a number of GPS satellites to determine the physical coordinates of the location at which the external stimuli is detected.

In some embodiments, the time between performing steps 430 and 440 can include a delay. Accordingly, there may be difference in time between the time the location of the consumer device is determined and then that information is sent to an activation server. Such embodiments allow for a device with no or limited network capabilities to detect or otherwise determine the location of the consumer, as described above, and then store or cache the location information for use at a later time. For example, a car may have various features that are specific to the buyer of the car that can be activated once a sensor in the car has detected an a stimulus or environmental condition and determined that the car has been delivered or made a trip to the buyer's home, office or other buyer specific location. The stimulus or environmental condition can include detecting a voice print of the buyer, the weight or size of the buyer, or biometric information such as retinal or fingerprint pattern.

Once the external stimulus or environmental condition is detected and the location information is determined, the stimulus information and/or the location information can be saved locally until a subsequent event occurs. When the subsequent event occurs, then the location, device or stimulus information can be sent to the activation server. In some embodiments, the subsequent event can include bringing the consumer device into proximity to a wireless network or otherwise connecting to a network. In such embodiments, the network may be located or have an IP address at a predefined location, thus increasing the reliability or security of the auto-activation process.

In step 440, the current location and account information is sent for verification and account activation to a communication network. Step 440 can happen immediately after step 430, or after a delay as described above. The communication network can include a wireless cellular network, Bluetooth, WiFi, WLAN, LAN or any combination of the aforementioned communication mediums used to communicate location data to the account activation server. The communication network from where the consumer device is located can additionally provide location verification information to the activation server, such as through the I.P. address of the wireless network from which the consumer device information is being sent.

In step 450, the current location and account information is verified. An issuer of the consumer device 100 can verify that the consumer device 100 was sent to and received by the user without any specific activation step by the user and/or modification of the data pertaining to the consumer device 100 and associated payment information stored on the consumer device 100.

In step 460, the consumer device 100 is activated and approved for use to make payments using the stored payment information. A response signal indicating a successful activation can be received on the consumer device 100 after activation is completed. For example, the response signal may include an alert message displayed when the consumer device 100 is powered "on" for the first time, or an SMS text, email, call, or automatic restart of the device. In one embodiment, the activation is completed on the activation server and no response signal is required by the consumer device prior to use.

Referring now to FIG. 5, a flow diagram of a method 500 of packaging, sending and detecting an automatically activated consumer device is shown.

In step 510, the consumer device is manufactured and packaged. At this step, an external stimulus sensor is enabled and initialized/reset to its rest state (i.e. no external stimulus detected). The consumer device 300 is packaged with a material which allows for the sensor to remain dormant and sent to a requesting user. In some embodiments, as often manufacturers and issuers of the devices are separate entities, the manufacturing and the subsequent sensor reset and device packaging can be performed at different times and locations.

In step 520, the external stimulus sensor continually checks to determine whether an external stimulus has been detected.

The sensor In some embodiments, the sensor can remain in an "off" position until a stimulus is detected, such as in the case of the aforementioned photodiode in the discussion of FIG. 4. The external stimulus (e.g., light) provides a current to the sensor, which provides the sensor the capability of sending a signal to the processor 140 of the consumer device 100. As previously mentioned, the charge produced by the external stimulus can also allow for the auto activation of the device prior to powering the device "on".

In step 530, once an external stimulus is detected a signal is sent to the processor 140 of the consumer device. The processor then sends instructions to the location determination system 120, requesting the current location data of the consumer device 120. the location can be determined through, for example, a GPS communication link provided in the consumer device. If a current location cannot be determined, no response signal or an error signal can be returned to the processor's request. If the current location is determined, the location data is returned to the processor.

With an error or location data response, the processor can then form an activation request message to send to the activation server. The activation request message can include the account number of the payment information stored on the consumer device 100 in addition to information about the consumer device 100. For example, the consumer device number (e.g., telephone number) or the consumer device serial number. The activation request can also include the location data of the consumer device 100. The location data can be in the form of coordinates or a physical address. In another embodiment in which the location data is not determined, the error message can be included in the activation request message. Inclusion of the error message can notify the activation server and the issuer of activation and theft issues.

As illustrated in FIG. 5, if the location of the consumer device 100 is not determined, the processor may continually send location request signals to the location determination system 120. The location determination system 120 then continually attempts to determine a location. Accordingly, if a predetermined number of request are received by the location determination system 120, the consumer device automatic activation can "time out" and the consumer device 100 can be locked into a deactivated state. For example, the aforementioned embodiment can be useful if the device is stolen and removed from the user's country as some location determination systems do not properly function outside a specified area covered by the user's issuer. In the aforementioned embodiment, both the consumer device 100 is not functional the related account information stored on the device can be irretrievable, protecting the user and the issuer from fraudulent use.

In step 540, the activation request message is sent through the wireless interface, e.g., an antenna 130, to the activation server for verification. In some embodiments, the processor can execute instructions which do not send any activation request message until location data has been determined. In which case, if a predetermined threshold of error messages is received by the processor, no activation request message is transmitted.

If an activation request message is sent by the consumer device 100, the activation server can perform a check on the received information in the message and provide a response signal to the consumer device causing the device to activate. In some embodiments, if an location error response or the incorrect current location data is received at the activation server, the issuer and/or payment processing network are/is notified, and a deactivation response signal is returned to the device causing permanent deactivation until the consumer device is, for example, physically presented to a issuer, or service provider for the issuer, for unlocking and re-activation.

III. Exemplary Computer Apparatuses and Access Devices

Figure 6:
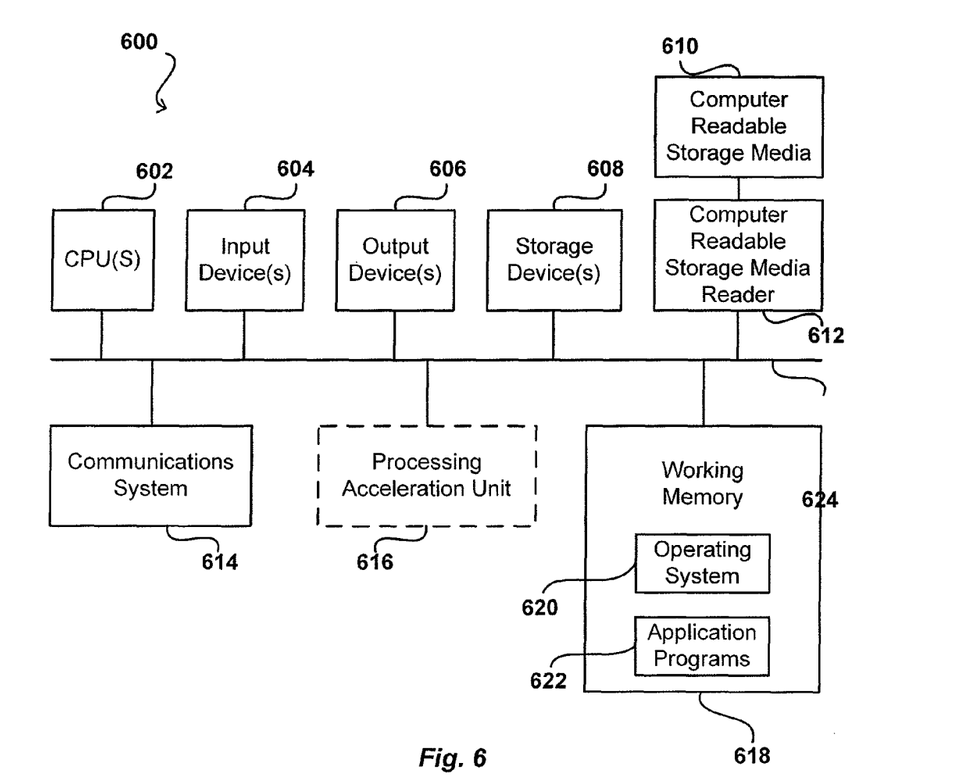
FIG. 6 shows a block diagram of an exemplary computer apparatus for use in the system of FIG. 3 in an embodiment.
Figure 7:
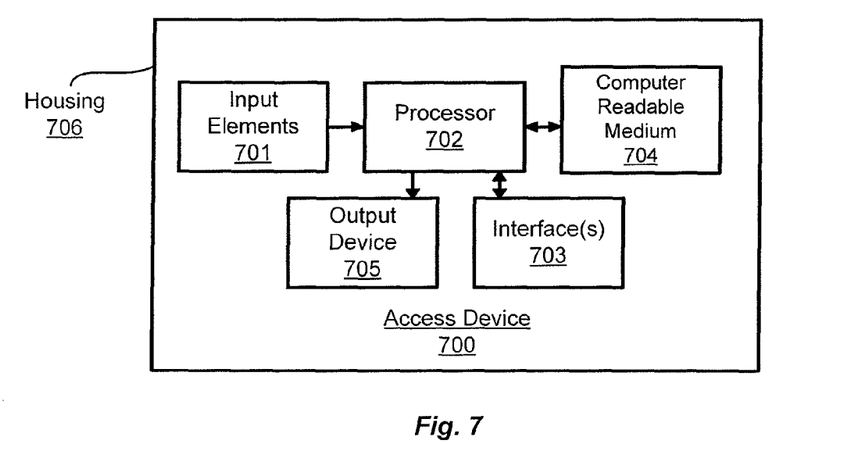
FIG. 7 illustrates a block diagram of an exemplary access device in an embodiment.

Computer apparatuses and access devices according to embodiments of the invention are illustrated in FIGS. 6-7.

FIG. 6 illustrates an exemplary computer system 600, in which various embodiments may be implemented. The system 600 may be used to implement any of the computer systems described above (e.g., client computer, a server computer at the card association, a server computer at the issuer, a computer apparatus at the merchant, etc.). The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 and working memory 618, which may include RAM and ROM devices as described above. The communications systems can include, for example, a modem, a network card (wireless or wired), an infra-red communication device, etc. In some embodiments, the computer system 600 can also include a processing acceleration unit 616, such as a digital signal processor (DSP), a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing, storing, transmitting, and retrieving computer-readable information. The communications system 614 can permit data to be exchanged with the network and/or any other computer described above with respect to the system 600.

The computer system 600 may also comprise software elements, shown to be located within a working memory 618, including an operating system 620 and/or application programs 622 comprising code, such as a client application, Web browser, mid-tier application, RDBMS, etc. It should be appreciated that alternate embodiments of a computer system 600 can have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Referring now to FIG. 7, access device 700, such as a reader is illustrated in one embodiment. The access device 700 can be communicatively coupled to a merchant register to form a point of sale terminal. The access device 700 can include one or more interfaces 703 (e.g., Universal Serial Bus (USB) connector, wired connection, etc.), one or more input elements 701 (chip card reader, Magstripe reader, barcode scanner, etc.), a housing 706, one or more output elements 705 (display, printer, external storage device), and a computer readable medium (CRM) 704. In one embodiment, the access device is capable of generating a cryptogram each time a consumer device is read for added security. In the case of contactless communication with the consumer device, the input elements 701 can be a transceiver capable of short range, or near field communication (NFC), such as an radio frequency RF transceiver, or an optical scanner. The access device 700 can also be referred to as a card terminal or card reader.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions, described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A consumer device capable of automatic activation, the consumer device comprising:
   a processor;
   a sensor for detecting an external stimulus;
   a location determination system for determining location data of the consumer device;
   an antenna for communicating the location data to a communication network; and a memory coupled to the processor, the memory comprising a computer readable medium including code, executable by a processor, for implementing a method comprising:
sending a request for the location data to the location determination system in response to the detected external stimulus by the sensor;
generating an activation request signal including the location data received from the location determination system; and
sending the activation request signal to the antenna.

2. The consumer device of claim 1, wherein the consumer device is cellular telephone or a payment card.

3. The consumer device of claim 1, wherein the sensor is a photodiode.

4. The consumer device of claim 1, wherein the location determination system includes a global positioning system (GPS) component.

5. The consumer device of claim 1, wherein the sensor includes two or more sensors.

6. A method for automatic activation of a consumer device on a server computer comprising:
assigning a user a consumer device with an associated account;
storing predetermined location data associated with the user on the server computer;
receiving an activation request message from the consumer device, including current location data of the consumer device, after the consumer device sends the activation request message in response to an external stimulus detected by a sensor in the consumer device;
comparing the predetermined location data and the current location data; and
sending an activation response signal to the consumer device.

7. The method of claim 6, wherein the activation response signal activates the consumer device if the predetermined location data corresponds to the current location data.

8. The method of claim 6, wherein the predetermined location data includes one or more predetermined locations.

9. The system of claim 6, wherein the activation request message additionally includes consumer device associated information.

10. A method for automatic activation on a consumer device, the method comprising:
obtaining a packaged consumer device associated with an account of a user, wherein the account information is stored on the consumer device;
detecting an external stimulus with a sensor;
sending a request for the location data to a location determination system in response to the detected external stimulus by the sensor;
determining current location data of the consumer device with the location determination system; and
sending an activation request signal to a communication network through an antenna.

11. The method of claim 10, wherein detecting the external stimulus with the sensor is achieved by removing the packaging.

12. The method of claim 10, further comprising:
generating an activation request signal including the location data from the location determination system.

13. The method of claim 10, further comprising:
receiving, through the communication network, an activation response signal from an activation server.

14. The method of claim 10, wherein the user is associated with one or more predetermined locations.

15. The method of claim 14 further comprising:
activating the consumer device and the account if the one or more predetermined locations of the user corresponds to the location data of the consumer device.

16. The method of claim 10, wherein the packaging of the consumer device prevents the detection of the external stimulus by the sensor.

17. A computer program product comprising a tangible computer readable medium storing a plurality of instructions for controlling a processor to implement the method of claim 6.

* * * * *